(12) United States Patent
Nemeth et al.

(10) Patent No.: US 11,780,415 B2
(45) Date of Patent: Oct. 10, 2023

(54) ELECTRIC SYSTEM FOR A VEHICLE

(71) Applicant: KNORR-BREMSE SYSTEME FUER NUTZFAHRZEUGE GMBH, Munich (DE)

(72) Inventors: Huba Nemeth, Budapest (HU); Levente Balogh, Szigetszentmiklos (HU); Csaba Horvath, Biatorbagy (HU); Falk Hecker, Markgroeningen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 541 days.

(21) Appl. No.: 16/327,245

(22) PCT Filed: Aug. 14, 2017

(86) PCT No.: PCT/EP2017/070592
§ 371 (c)(1),
(2) Date: Feb. 21, 2019

(87) PCT Pub. No.: WO2018/046247
PCT Pub. Date: Mar. 15, 2018

(65) Prior Publication Data
US 2019/0241164 A1 Aug. 8, 2019

(30) Foreign Application Priority Data

Sep. 8, 2016 (EP) ..................................... 16187848

(51) Int. Cl.
*B60T 8/17* (2006.01)
*B60T 8/32* (2006.01)
(Continued)

(52) U.S. Cl.
CPC .......... *B60T 8/1708* (2013.01); *B60R 1/1207* (2013.01); *B60T 7/042* (2013.01);
(Continued)

(58) Field of Classification Search
CPC .......... B60T 8/1708; B60T 7/042; B60T 7/20; B60T 8/248; B60T 8/323; B60T 13/662;
(Continued)

(56) References Cited

U.S. PATENT DOCUMENTS 6,264,289 B1 7/2001 Franke et al.
7,424,347 B2 9/2008 Babala et al.
(Continued)

FOREIGN PATENT DOCUMENTS

CN  101384464 A  3/2009
CN  101402363 A  4/2009
(Continued)

OTHER PUBLICATIONS

International Search Report dated Nov. 28, 2017, of the corresponding International Application PCT/EP2017/070592 filed Aug. 14, 2017.
(Continued)

*Primary Examiner* — Hussein Elchanti
(74) *Attorney, Agent, or Firm* — NORTON ROSE FULBRIGHT US LLP; Gerard Messina; Aaron Deditch

(57) ABSTRACT

An electric system of a vehicle including an electronically controlled braking system. The electric system has a steering angle sensor unit, at least one control module, at least one first inertia sensor and an electronic braking system central control unit EBS ECU. The at least one control module is external to the steering angle sensor unit. The at least one control module is also external to the EBS ECU. At least one of the at least one control module has mounted within it one of the at least one first inertia sensor.

24 Claims, 4 Drawing Sheets

(51) Int. Cl.
  *B60T 13/68* (2006.01)
  *B60T 7/20* (2006.01)
  *B60T 13/66* (2006.01)
  *G09G 5/00* (2006.01)
  *B60R 1/12* (2006.01)
  *B60T 8/24* (2006.01)
  *B60T 7/04* (2006.01)
  *B60T 17/00* (2006.01)

(52) U.S. Cl.
  CPC ............... *B60T 7/20* (2013.01); *B60T 8/248* (2013.01); *B60T 8/323* (2013.01); *B60T 13/662* (2013.01); *B60T 13/683* (2013.01); *B60T 17/004* (2013.01); *G09G 5/00* (2013.01); *B60R 2001/1253* (2013.01); *B60R 2001/1284* (2013.01)

(58) Field of Classification Search
  CPC ... B60T 13/683; B60T 17/004; B60R 1/1207; G09G 5/00
  See application file for complete search history.

(56) References Cited

U.S. PATENT DOCUMENTS

| | | | |
|---|---|---|---|
| 8,989,949 B2 | 3/2015 | Lohberg et al. | |
| 9,568,915 B1* | 2/2017 | Berntorp | B60W 30/095 |
| 2005/0209762 A1* | 9/2005 | Lu | B60T 13/66 |
| | | | 701/70 |
| 2008/0030072 A1 | 2/2008 | Legeza et al. | |
| 2009/0319186 A1* | 12/2009 | Kumar | G05D 1/027 |
| | | | 701/472 |
| 2010/0201896 A1 | 8/2010 | Ostreko et al. | |
| 2010/0253493 A1 | 10/2010 | Szczerba et al. | |
| 2010/0253540 A1 | 10/2010 | Seder et al. | |
| 2010/0253541 A1 | 10/2010 | Seder et al. | |
| 2011/0031804 A1* | 2/2011 | Shimada | B60T 8/266 |
| | | | 303/2 |
| 2011/0087398 A1* | 4/2011 | Lu | B60G 17/019 |
| | | | 701/31.4 |
| 2013/0158801 A1 | 6/2013 | Tober et al. | |
| 2015/0203082 A1 | 7/2015 | Forster et al. | |
| 2016/0068144 A1* | 3/2016 | Hummel | B60T 8/1708 |
| | | | 701/78 |
| 2016/0332606 A1 | 11/2016 | Buchner et al. | |
| 2017/0274877 A1* | 9/2017 | Wou | B60T 8/1766 |
| 2017/0334261 A1* | 11/2017 | Tsu | B60G 17/0162 |
| 2018/0015931 A1* | 1/2018 | Berntorp | B60T 8/172 |
| 2018/0251112 A1* | 9/2018 | Griesser | B60T 17/004 |
| 2018/0365859 A1* | 12/2018 | Oba | B60R 1/00 |
| 2019/0241164 A1* | 8/2019 | Nemeth | B60T 8/1708 |

FOREIGN PATENT DOCUMENTS

| | | |
|---|---|---|
| DE | 10065724 A1 | 7/2002 |
| DE | 102009013895 A1 | 9/2010 |
| DE | 102013021681 A1 | 6/2015 |
| DE | 102014006613 A1 | 11/2015 |
| DE | 102014013756 B3 | 2/2016 |
| DE | 102015119136 A1 | 5/2017 |
| EP | 2077215 B1 | 8/2012 |
| EP | 2254779 B1 | 11/2013 |
| EP | 2454135 B1 | 7/2017 |
| JP | H11-115717 A | 4/1999 |
| JP | 2003054397 A | 3/2003 |
| WO | 2009050297 A1 | 4/2009 |
| WO | 2013037827 A1 | 3/2013 |
| WO | 2015158904 A1 | 10/2015 |
| WO | 2016135435 A1 | 9/2016 |

OTHER PUBLICATIONS

Hermann Winner, et al. "HandbuchFahrerassistenzsysteme" with Machine Translation of first paragraph: "Handbook—Driver Assistance Systems: Principles, Components, and Systems for Active Safety and Comfort", 2009, ISBN 978-3-8348-0287-3.

"EBS: Elektronisch Geregeltes Bremssystem: System—und Funktionsbeschreibung," with Machine Translation of first paragraph: "EBS: Electronically Controlled Braking System: System and Functional Description", WABCO 2007.

"Fahrdynamikregelung" with Machine Translation of first paragraph: "Vehicle Dynamics Control"—Wikipedia page from Jul. 17, 2016.

"Airbag"—Wikipedia page from Sep. 6, 2016, with Machine Translation of first paragraph.

"Elektronisches Bremssystem" with Machine Translation of first paragraph: "Electronic Braking System"—Wikipedia page from Mar. 10, 2016.

* cited by examiner

ELECTRIC SYSTEM FOR A VEHICLE

FIELD OF THE INVENTION

The present invention relates to an electric system for a vehicle and to a vehicle having an electric system.

BACKGROUND INFORMATION

The autonomous operation of transport vehicles is a new field of inventions. More sophisticated functions require high-end hardware (HW) infrastructure including different type of sensors and perception technologies. SAE Automation level 2 systems require the presence and attention of the driver. Level 3 systems should manage autonomous driving without the continuous attention of the driver. Information relating to SAE Automation levels can be found at http://www.sae.org/misc/pdfs/automated_driving.pdf.

Patent document DE 10 065 724 A1 relates to a brake regulating system for stabilizing the movement of a commercial vehicle. The system uses a standalone chassis installed yaw rate and lateral acceleration sensor.

Patent document DE10 2009 013 895 A1 relates to a device for regulating driving dynamics of a commercial motor vehicle. Steering angle and yaw rate sensors are assembled in a common structural unit, with an acceleration sensor that is three-axis sensor for detection of acceleration. The sensors are integrated into a steering angle sensor unit.

SUMMARY OF THE INVENTION

Therefore, it is an object of the invention to have an improved electric system for providing sensor information that can be used to provide dynamic control for use in automated driving situations of a vehicle.

The object of the present invention is solved with the subject matter of the independent claims, wherein further embodiments are incorporated in the dependent claims. It should be noted that the following described aspects of the invention apply also for the electronically controlled braking system and to the vehicle having an electronically controlled braking system.

In a first aspect, there is provided an electric system for a vehicle including an electronically controlled brake system EBS, comprising:
  a steering angle sensor unit;
  at least one control module;
  at least one first inertia sensor; and
  an electronic braking system central control unit EBS ECU of the electronically controlled brake system EBS.

The at least one control module is external to the steering angle sensor unit, and the at least one control module is external to the electronic braking system central control unit EBS ECU. At least one of the at least one control module has mounted within it or on it one of the at least one first inertia sensor.

In the following, a control module can be understood as a constructional unit or entity with one common housing for all of its elements or its components or with several housings directly attached to each other, where its elements or its components being distributed among the several housings. Thus, the one of the at least one first inertia sensor can be mounted within or directly on the one housing or within or directly on one housing of the several housings attached to each other of the at least control module. When the at least one first inertia sensor is mounted on the at least one control module that means that it forms a part or an element of the at least one control unit. On the contrary, that does not mean that it is located externally with respect to the at least one control module.

In other words, the electronic system of the vehicle has a number of different units and modules, including a steering angle sensor unit and electronic braking system central control unit EBS ECU of the electronically controlled brake system EBS, and at least one control module which can be a number of control modules. An inertia sensor can be mounted in, within or on one control module, or more than one control module can have an inertia sensor mounted in, within or on it. An inertia sensor can provide information such as yaw rate, acceleration, deceleration, and provide information on roll rates. This information from one or more inertia sensors mounted in, within or on one or more control modules can be used for stabilisation of the vehicle, and can also be used to facilitate and improve automated driving without the continuous attention of the driver.

In this manner, inertia information is provided enabling dynamic control solutions. By providing inertia sensors being located in, within or on control module(s) of the electric system, the inertia information provided is captured accurately with respect to the functionality of the control module in, within or on which the inertia sensor is located. This improves the dynamic control of the overall vehicle.

In an example, a first inertia sensor is mounted in, within or on an electronic air processing unit.

An electronic air processing unit normally incorporates at least an air dryer and a multi-circuit protection valve. Further, pressure sensors and solenoid valves can be also included. Optionally, a clutch and an electrically driven compressor can be also included within the electronic air processing unit. The electronic air processing unit can form a part of the electronically controlled brake system EBS as it provides the latter with dried and purified process air.

Electronic air processing units normally provide at least one pneumatic consumer like at least one service brake pressure control module, at least one trailer brake module and/or at least one parking brake valve or module of the electronically controlled brake system with dried air, particularly in different air circuits.

Electronic air processing units are generally fixed to a vehicle chassis, and generally located not far from the centre of gravity of the vehicle. Therefore, by locating an inertia sensor in, within or on the electronic air processing unit, inertia information is provided with respect to the centre of gravity of the vehicle, thereby providing important baseline information.

In an example, a first inertia sensor is mounted in, within or on a foot brake module.

A foot brake module normally incorporates an electric channel that generates a first electric control signal depending upon the actuation of a foot brake actuation member as well as at least one pneumatic channel that generates a pneumatic control signal depending upon the actuation of a foot brake actuation member. The electric channel incorporates an electric position or angle sensor that measures the actuation position or the actuation angle of the foot brake actuation member for generating the first electric control signal. The at least one pneumatic channel incorporates at least one foot brake control valve that generates the pneumatic control signal depending upon the actuation of the foot brake actuation member.

Normally, the first electric control signal generated by the electric channel of the foot brake module is being transferred to the electronic braking system central control unit EBS ECU of the electronically controlled brake system EBS. There, on the basis of the first electric control signal there is generated a second electric control signal for electronically controlling at least one service brake pressure control module and, if present within the electronic braking system, also for electronically controlling a trailer control module.

In this way, because the foot brake module is an input signal generator of the service brake inertia information provided from an inertia sensor within the foot brake module is usable to ensure effective improved operation of the service brake.

In an example, a first inertia sensor is mounted in, within or on a service brake pressure control module, which controls the service brake pressure in a control loop.

A service brake pressure control module normally incorporates at least one solenoid valve arrangement, at least one relay valve, at least one backup valve, at least one pressure sensor and at least one local electronic control unit. The at least one local electronic control unit receives the second electric signal as generated by the electronic braking system central control unit EBS ECU to control the at least solenoid valve arrangement. The at least one local electronic control unit is provided with control routines that control a service brake pressure in a closed loop manner. The service brake pressure is issued by the relay valve for at least one pneumatic brake actuator like a pneumatic brake cylinder. The relay valve is pneumatically controlled by a control pressure generated by the at least one solenoid valve arrangement that is electrically controlled by the at least one local electronic control unit. The service brake pressure as generated by the relay valve on the basis of the control pressure is measured by the pressure sensor and reported by an electric signal to the local electronic control unit for realisation of the closed loop control of the service brake pressure. On the other hand, the at least one backup valve is provided with the pneumatic control signal generated in the pneumatic channel of the foot brake module. During normal operation, the at least one backup valve is in its closed position so that the pneumatic control signal cannot be delivered as control pressure to the relay valve. But in case that the electric or electronic control fails, the at least one backup valve automatically switches in its open position so that the pneumatic control signal can be delivered as control pressure to the relay valve.

Such a service brake pressure control module can provide several different channels, where within each channel the service brake pressure for one or more pneumatic brake actuators is loop controlled separately.

Service brake pressure control modules are generally fixed to a vehicle chassis. Therefore, by locating an inertia sensor in, within or on a service brake pressure control module inertia information is provided with respect to movement of the vehicle chassis, thereby providing important baseline information.

In an example, a first inertia sensor is mounted in, within or on a trailer control module which controls the service brake pressure for a trailer in a control loop.

A trailer brake pressure module normally incorporates at least one solenoid valve arrangement, at least one relay valve, at least one backup valve, at least one pressure sensor and at least one local electronic control unit. The at least one local electronic control unit receives the second electric signal as generated by the electronic braking system central control unit EBS ECU to control the at least one solenoid valve arrangement. The at least one local electronic control unit is provided with control routines that control a service brake pressure for the trailer in a closed loop manner. The service brake pressure for the trailer is issued by the relay valve for at least one pneumatic brake actuator of the trailer like a pneumatic brake cylinder. The relay valve is pneumatically controlled by a control pressure generated by the at least one solenoid valve arrangement that is electrically controlled by the at least one local electronic control unit. The service brake pressure for the trailer as generated by the relay valve on the basis of the control pressure is measured by the pressure sensor and reported by an electric signal to the local electronic control unit for realisation of the closed loop control of the service brake pressure for the trailer. On the other hand, the at least one backup valve is provided with the pneumatic control signal generated in the at least one pneumatic channel of the foot brake module. During normal operation, the at least one backup valve is in its closed position so that the pneumatic control signal cannot be delivered as control pressure to the relay valve. But in case that the electric or electronic control fails, the at least one backup valve automatically switches in its open position so that the pneumatic control signal can be delivered as control pressure to the relay valve. Thus, the function of a trailer control module is similar to the one of the service brake pressure control module.

Trailer control modules are generally fixed to a vehicle chassis. Therefore, by locating an inertia sensor within a trailer control module inertia information is provided with respect to movement of the vehicle chassis, thereby providing important baseline information.

In an example, the at least one control module, in, within or on which is mounted the one of the at least one first inertia sensor, is configured to be in direct communication contact with the electronic braking system central control unit EBS ECU.

In this manner, by being in direct communication with the electronic braking system central control unit EBS ECU, inertia information provided by inertia sensors that can be one or more control modules, is immediately usable by the electronic braking system central control unit EBS ECU to improve the overall functionality of the electronically controlled brake system EBS.

In an example, a first inertia sensor is mounted in, within or on a parking brake module, parking brake valve and/or parking brake relay valve. The parking brake module, the parking brake valve and/or the parking brake relay valve can be seen forming a part of the electric system of a vehicle as the actuation of these units is often effected electrically.

A parking brake module normally includes or is electrically connected with a parking brake actuation member cooperating with an electric position or angle sensor that measures the actuation position or the actuation angle of the parking brake actuation member for generating a third electric control signal that is fed into a local electronic control unit of the parking brake module. Further, the parking brake module incorporates a solenoid valve arrangement that generates a parking brake pressure for at least one pneumatic parking brake actuator like a pneumatic spring brake cylinder, depending on a fourth electric signal that is generated by the local electronic control unit depending on the third electric signal.

In this way, operation of the parking brake can be improved because the parking brake is controlled by the parking brake module or the parking brake valve and the pressure can optionally be executed by the parking brake relay valve, with inertia information being provided with respect to the parking brake module valve or relay, in order that dynamic control can be provided more effectively.

In an example, a first inertia sensor is mounted in, within or on a steering gear module.

A steering gear module incorporates a steering gear and can further be equipped with a local electronic control unit that is electrically connected with the steering angle sensor unit to realize a "steer-by-wire-system". In this, the steering angle sensor unit is mechanically connected with a steering column and generates a fifth electric signal depending upon an actuation of a steering wheel mounted on the steering column that is fed into the local electronic control unit of the steering gear module, where the local electronic control unit generates a sixth electric signal on the basis of the fifth electric signal, for controlling an electrical steering actuator. Further, the local electronic control unit of the steering gear module can receive automatically generated control signals from electronic stability systems ESP to influence driving stability of the vehicle.

The steering angle sensor unit as well as the steering gear module can cooperate with the electronically controlled brake system EBS because electronic stability systems ESP are often integrated into an EBS that automatically actuates the service brakes in case of dynamic instability of the vehicle due to steering maneuvers of the driver.

Steering gear modules are generally fixed to a vehicle chassis. Therefore, by locating an inertia sensor within a steering gear module inertia information is provided with respect to movement of the vehicle chassis, thereby providing important baseline information.

In an example, a second inertia sensor is located externally to the at least one control module, and wherein a first power supply is configured to power the at least one first inertia sensor and a second power supply is configured to power the second inertia sensor.

In this manner safety redundancy information is provided, because either a first or second inertia sensor can fail enabling inertia information to be provided from the other inertia sensor, or a power supply to the first inertia sensor can fail however because the second inertia sensor is on a separate power supply, a continuation of the provision of inertia information is provided. In this way, continuous automated driving providing dynamic control solutions is enabled, even when components or power supplies of the electronically controlled brake system EBS fail.

In an example, the second inertia sensor is mounted in, within or on the electronic braking system central control unit EBS ECU.

In this way, improved dynamic control is provided because at least two inertia sensors mounted at different locations are providing inertia information, was at the same time safety backup is provided because either a inertia sensor and/or 1st power supply can fail but inertia information will continue to be provided. Also, by providing the second inertia sensor in, within or on the electronic braking system central control unit EBS ECU, the inertia information provided by the second inertia sensor is directly usable by the electronic braking system central control unit EBS ECU to improve the overall functionality of the electronically controlled brake system, and furthermore cabling is reduced because the second inertia sensor is mounted in, within or on the electronic braking system central control unit EBS ECU.

In an example, any or all of the at least one first inertia sensor and the second inertia sensor are either: rotational sensors with any axis; or translational or linear sensors with any axis.

In a second aspect, there is provided a vehicle comprising an electric system according to the first aspect.

The above aspects and examples will become apparent from and be elucidated with reference to the embodiments described hereinafter.

Exemplary embodiments will be described in the following with reference to the following drawings.

DETAILED DESCRIPTION

Figure 1:
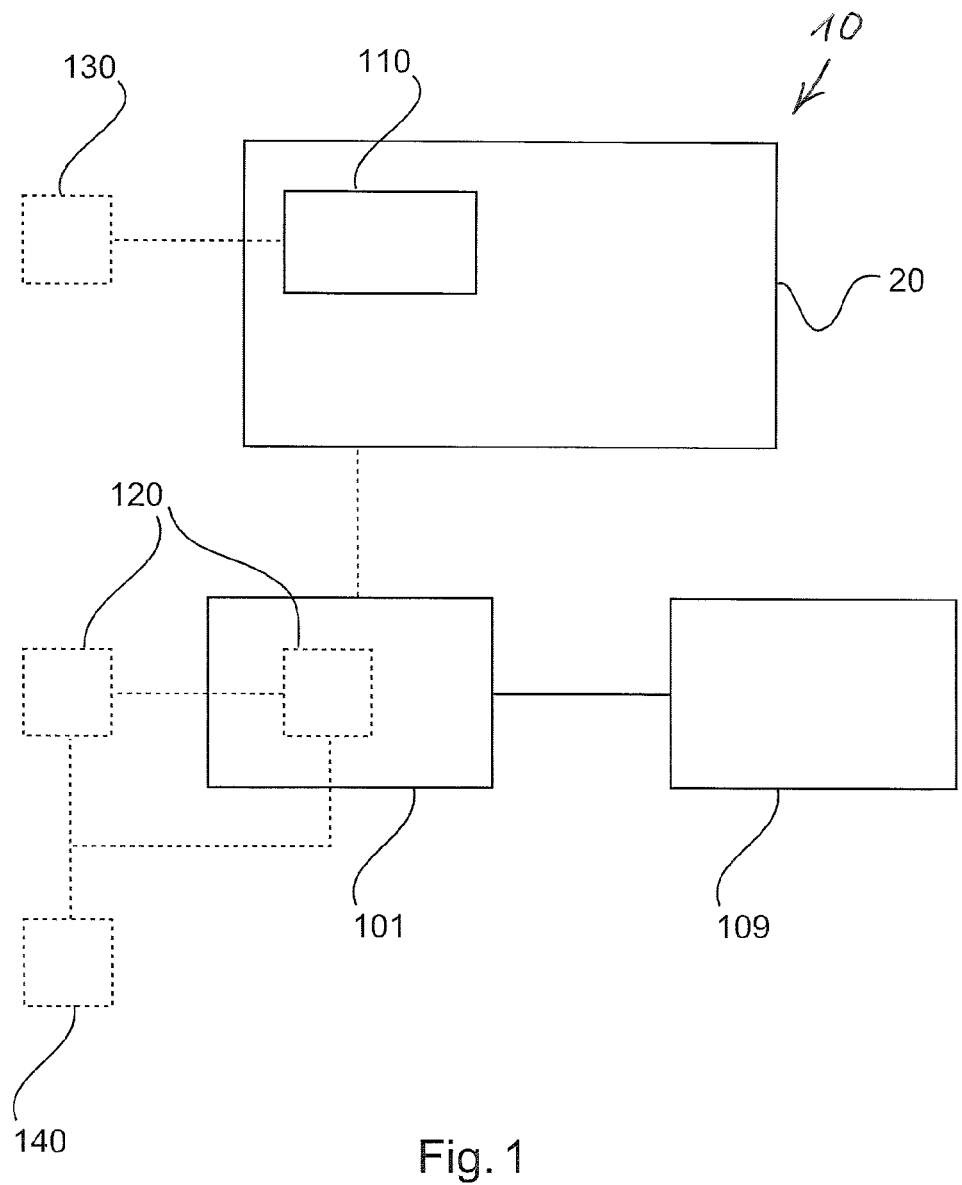
FIG. 1 shows a schematic representation of an example of an electric system for a vehicle.
Figure 2:
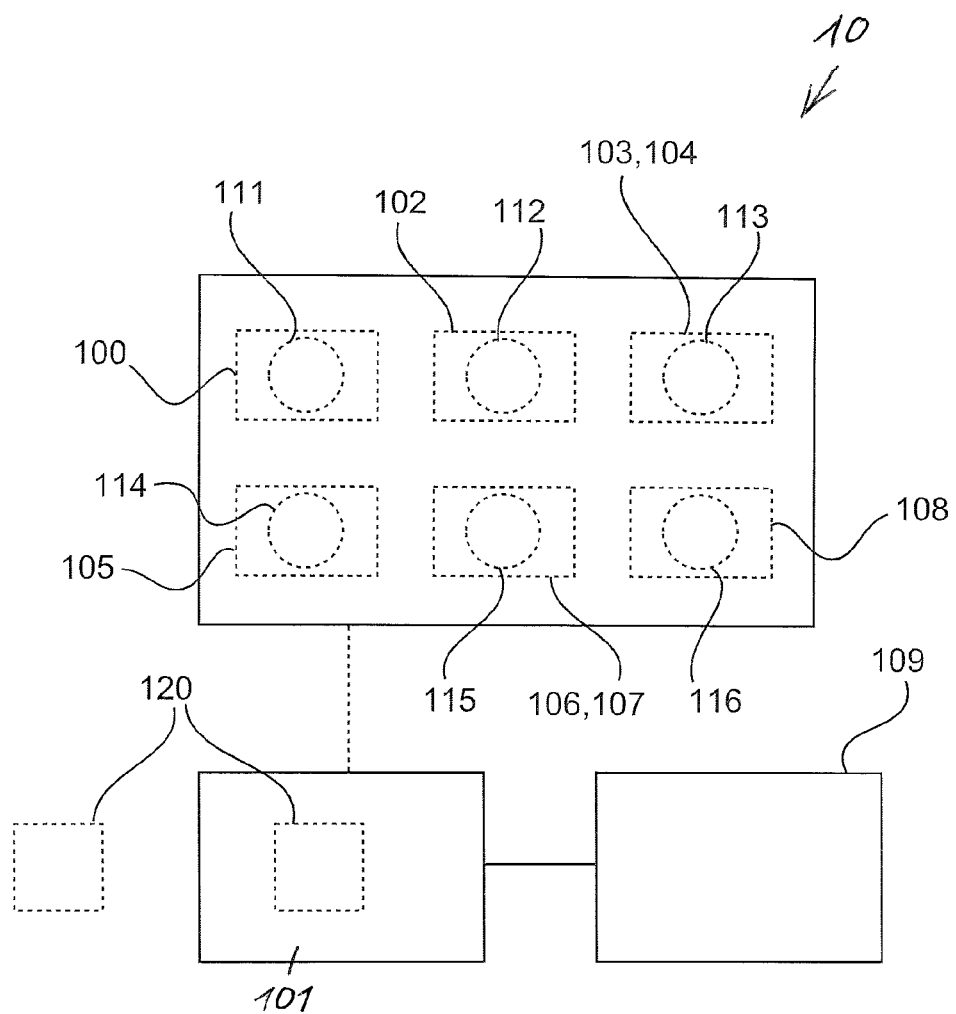
FIG. 2 shows a schematic representation of an example of an electric system for a vehicle.
Figure 3:
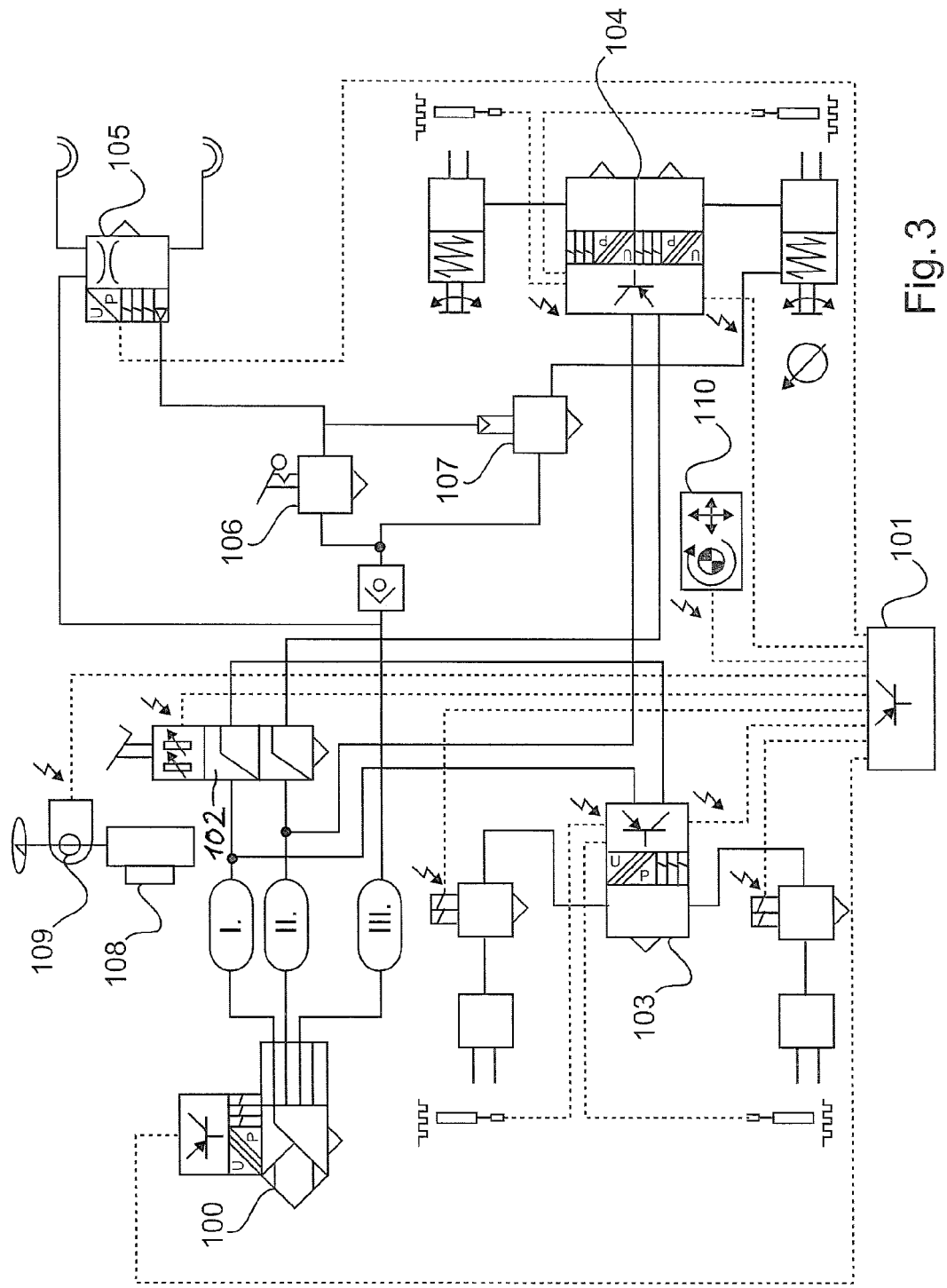
FIG. 3 shows schematic representation of an example of a detailed architecture of an electronic system for a vehicle.

FIG. 1 and FIG. 2 show examples of an electronic system 10 for a vehicle 200 including an electronically controlled brake system EBS, and FIG. 3 shows an example of a detailed architecture of an electric system 10 for a vehicle 200. The electric system 10 comprises a steering angle sensor unit 109, at least one control module 20, at least one first inertia sensor 110, and an electronic braking system central control unit EBS ECU 101 of the electronically controlled brake system EBS. The at least one control module 20 is external with respect to the steering angle sensor unit 109. The at least one control module 20 is also external to the electronic braking system central control unit EBS ECU 101. At least one of the at least one control module 20 has mounted int, within it or on it one of the at least one first inertia sensor 110.

As can be best seen in FIG. 2, according to an example, the at least one control module 20 comprises an electronic air processing unit 100. A first inertia sensor 111, of the at least one first inertia sensor 110, is mounted in, within or on the electronic air processing unit 100.

In an example, the electronic air processing unit 100 is connected electrically or electronically with the electronic braking system central control unit EBS ECU 101. Accordingly, information provided by the first inertia sensor 111 within the electronic air processing unit 100 that can be providing inertia information with respect to the centre of gravity of the vehicle will be usable by the electronic braking system central control unit EBS ECU 101 to improve the overall functionality of the electronically controlled brake system EBS including dynamic stability control of the vehicle.

According to an example, the at least one control module 20 comprises a foot brake module 102. A first inertia sensor 112, of the at least one first inertia sensor 110, is mounted in, within or on the foot brake module 102.

In an example, the foot brake module 102 is connected electrically or electronically with the electronic braking system central control unit EBS ECU 101. Accordingly, information provided by the first inertia sensor 112 within the foot brake module 102 will be usable by the electronic braking system central control unit EBS ECU 101 to improve the overall functionality of the electronically controlled brake system EBS.

According to an example, the at least one control module 20 comprises a service brake pressure control module 103, 104. A first inertia sensor 113, of the at least one first inertia sensor 110, is mounted in, within or on the service brake pressure control module 103, 104.

In an example, the service brake pressure control module 103, 104 is connected electrically or electronically with the electronic braking system central control unit EBS ECU 101. Accordingly, information provided by the first inertia sensor 113 within the service brake pressure control module 103, 104 that can be providing inertia information with respect to the chassis of the vehicle will be usable by the electronic braking system central control unit EBS ECU 101 to improve the overall functionality of the electronically controlled brake system EBS.

According to an example, the at least one control module 20 comprises a trailer control module 105. A first inertia sensor 114, of the at least one first inertia sensor 110, is mounted in, within or on the trailer control module 105.

In an example, the trailer control module 105 is connected electrically or electronically with the electronic braking system central control unit EBS ECU 101. Accordingly, information provided by the first inertia sensor 114 within the trailer control module 105 that can be providing inertia information with respect to the chassis of the vehicle will be usable by the electronic braking system central control unit EBS ECU 101 to improve the overall functionality of the electronically controlled brake system EBS.

According to an example, any of the one or control modules 20 which have a first inertia sensor 110 mounted in, within or on it are in communication contact with the electronic braking system central control unit EBS ECU 101. This can be via wired or wireless communication.

According to an example, the at least one control module 20 comprises a parking brake module 106, a parking brake valve 106 and/or a parking brake relay valve 107. A first inertia sensor 115, of the at least one first inertia sensor 110, is mounted in, within or on the parking brake module 106, the parking brake valve 106 and/or the parking brake relay valve 107.

In an example, the parking brake module 106, the parking brake valve 106 and the parking brake relay valve 107 are integrated and equipped with an electronic control unit.

Although not shown in FIG. 3, according to an example, the parking brake control module 106 which have a first inertia sensor 115 mounted in, within or on it is in communication contact with the electronic braking system central control unit EBS ECU 101. Accordingly, information provided by the first inertia sensor 115 in, within or on the parking brake control module 106 that can be providing inertia information with respect to the chassis of the vehicle will be usable by the electronic braking system central control unit EBS ECU 101 to improve the overall functionality of the electronically controlled brake system EBS.

According to an example, the at least one control module 20 comprises a steering gear module 108. A first inertia sensor 116, of the at least one first inertia sensor 110, is mounted within the steering gear module 108.

In an example, the steering gear module 108 is connected electronically with the electronic braking system central control unit EBS ECU 101. Accordingly, information provided by the first inertia sensor 116 within the steering gear module 108 that can be providing inertia information with respect to the chassis of the vehicle will be usable by the electronic braking system central control unit EBS ECU 101 to improve the overall functionality of the electronically controlled brake system EBS.

According to an example and FIG. 1, a second inertia sensor 120 is located externally to the at least one control module 20. A first power supply 130 is configured to power the at least one first inertia sensor 110 and a second power supply 140 is configured to power the second inertia sensor 120.

In an example, the first power supply 130 is a battery. In an example, the second power supply 140 is a battery. In an example, the first power supply 130 can be a generator. In an example, the second power supply 140 can be a generator. In an example, the first power supply 130 is formed from a battery and a generator. In this example, a first battery can be used to provide power when the internal combustion engine is not running. However, when the internal combustion engine is running a first generator powered from the engine can be used to provide power and power need not be taken from the battery. Similar the second power supply 140 can be formed from a second battery and a second generator.

According to an example, the second inertia sensor 120 is mounted in, within or on the electronic braking system central control unit EBS ECU 101.

According to an example, any or all of the at least one first inertia sensor 110 and the second inertia sensor 120 are either: rotational sensors with any axis; or translational or linear sensors with any axis.

In other words, inertia sensors 110 can be provided in or on any one or more of, including in all of: an electronic air processing unit 100; a foot brake module 102; service brake pressure control module 103, 104; a trailer control module 105; a parking brake module 106, a parking brake valve 106 and/or a parking brake relay valve 107 or an integrated unit housing parking brake valve 106 and/or parking brake relay valve 107; or a steering gear module 108.

And first inertia sensors 110 in any of these control modules 20 can be powered by a first power supply 130. Then a second inertia sensor 120 can be mounted in, within or on another module, such as the electronic braking system central control unit EBS ECU 101 or mounted to the chassis, or mounted within the steering angle sensor unit 109.

The second inertia sensor 120 is the powered by a separate power supply 140. Therefore, if the first sensors 110 fail or the first power supply 130 fails, inertia data are continued to be acquired and used within the electric system 10 and particularly within the electronically controlled brake system EBS. Similarly, if the second sensor or sensors 120 fail or the second power supply 140 fails, inertia data are continued to be acquired and used within the electric system 10 and particularly within the electronically controlled brake system EBS.

Figure 4:
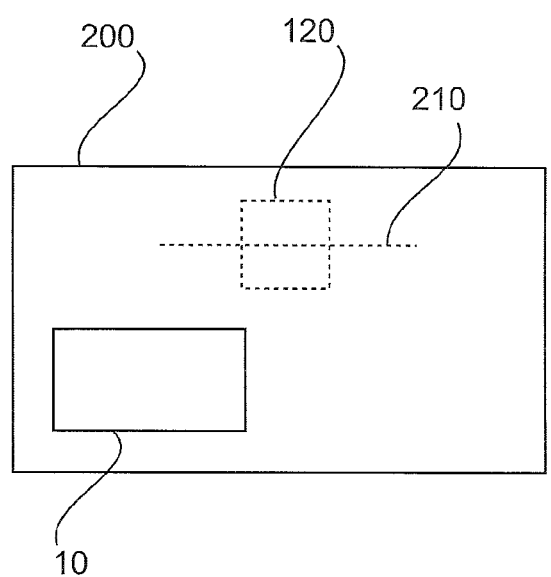
FIG. 4 shows a schematic representation of an example of a vehicle having such an electric system.

FIG. 4 shows a vehicle 200. The vehicle has an electric system 10 as described with respect to any or all of FIG. 1, FIG. 2 and FIG. 3 as described above.

In an example, the second sensor 120 is mounted to a chassis 210 of the vehicle 200.

Referring again to FIG. 3, which shows a detailed architecture of an electric system 10 where the electronically controlled brake system EBS can also be called an electro-pneumatic brake system. The electro-pneumatic brake system is composed of the following main components: The compressed air is processed and controlled by an electronic air processing unit, or module, 100, it provides compressed, dried and purified air into multiple independent circuits. The service brake is commanded by the foot brake module FBM 102, its signal is processed by the electronic braking system central control unit EBS ECU 101, which may be located in the driver cabin. However, the electronic braking system central control unit EBS ECU 101 can be located elsewhere. The electronic braking system central control unit EBS ECU 101 is commanding the front 103 and rear axle electro-pneumatic pressure modulators, or modules, 104, which are providing the requested brake pressure to the wheel end actuators, e.g. pneumatic service brake cylinders. The brakes of the trailer are controlled by the trailer control module TCM 105. The parking brake is controlled by the parking brake valve, or module, PBM 106 and the pressure generated there can be executed by an optional parking brake relay valve 107. In certain systems with electro-pneumatic parking brakes (EPBs), the two components 106 and 107 can be integrated and equipped with an electronic control unit, or parking brake module 106. The electronic braking system central control unit EBS ECU 101 also reads the signal of the steering angle sensor 109, which is located on the steering column. The steering column is connected to the steering gear module 108. Any of the above modules 100, 102, 103, 104, 105, 106, 107 and 108 can be considered to be a control module 20 as discussed above.

Finally the inertia sensor unit 110 is also read in by the electronic braking system central control unit EBS ECU 101 for stability control functions. Just for clarity purposes, the inertia sensor unit 110 is shown separately to control modules 20, with FIG. 2 showing possible positioning of specific ones of the inertia sensors 110. The possible specific positioning of ones of the inertia sensors 110 are also discussed above. The inertia sensor unit 110 can be a standalone unit installed into the motor vehicle chassis close to the center of gravity, in which case it is termed inertia sensor 120, which is not shown as such in FIG. 3. The second inertia sensor 120 can be integrated into the electronic braking system central control unit EBS ECU 101 if the electronic braking system central control unit EBS ECU is chassis installed, and in this way the cabling between the two components is eliminated. The second inertia sensor 120 can also be integrated into the steering angle sensor 109, but this is not shown in FIG. 3. The inertia sensor units 110 and 120 can include multiple sensors, both rotational yaw rate and linear accelerometers with multiple axes.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items recited in the claims. The mere fact that certain measures are re-cited in mutually different dependent claims does not indicate that a combination of these measures cannot be used to advantage. Any reference signs in the claims should not be construed as limiting the scope.

THE LIST OF REFERENCE NUMBERS IS AS FOLLOWS

10 Electric system;
20 At least one control module;
101 An electronic braking system central control unit EBS ECU;
109 Steering angle sensor unit;
100 An electronic air processing unit;
102 A foot brake module;
103,104 A service brake pressure control module;
105 A trailer control module;
106 A parking brake valve/module;
107 A parking brake relay valve;
108 A steering gear module;
110 At least one first inertia sensor;
111 A first inertia sensor mounted within the electronic air processing; unit;
112 A first inertia sensor mounted within the foot brake module;
113 A first inertia sensor mounted within the service brake pressure module
114 A first inertia sensor mounted within the trailer control module;
115 A first inertia sensor mounted within the parking brake valve and/or relay;
116 A first inertia sensor mounted within the steering gear module;
120 A second inertia sensor;
130 A first power supply;
140 A second power supply;
200 Vehicle;
210 Chassis of vehicle.

The invention claimed is:

1. An electric system of a vehicle, which includes an electronically controlled brake system EBS, comprising:
    a steering angle sensor unit to measure a steering angle of a steering wheel;
    at least one control module;
    at least one first inertia sensor; and
    an electronic braking system central control unit (EBS ECU) of the electronically controlled brake system (EBS);
    wherein the at least one control module is external to the steering angle sensor unit,
    wherein the at least one control module is external to the electronic braking system central control unit (EBS ECU), and
    wherein at least one of the at least one control module has mounted in it, within it or on it one of the at least one first inertia sensor,
    wherein the electric system provides sensor information to provide dynamic control for an automated driving situation of the vehicle,
    wherein the at least one control module includes an electronic air processing unit coupled to a foot brake module,
    wherein the electronic air processing unit is coupled to service brake pressure control modules, each of which is coupled to the foot brake module,
    wherein the service brake pressure control modules are coupled electrically or electronically with the EBS ECU, wherein inertia information with respect to a center of gravity of the vehicle is used by the EBS ECU to improve a functionality of EBS including dynamic stability control of the vehicle, wherein the at least one control module has one common housing for its elements or components or has a plurality of housings directly attached to each other, in which the elements or the components are distributed among the plurality of the housings, wherein the at least one first inertia sensor is mounted within or directly on the one housing or within or directly on one housing of the plurality of housings attached to each other of the at least one control module, wherein by locating the at least one inertia sensors in or on control modules of the electric system, the inertia information provided is captured accurately with respect to a functionality of the control module in or on which the at least one inertia sensor is located, so as to improve dynamic control of the vehicle, and wherein the electronic air processing unit includes at least an air dryer and a multi-circuit protection valve, and wherein the electronic air processing unit forms a part of the electronically controlled brake system EBS as it provides the EBS with dried and purified process air.

2. The electric system of claim 1, wherein a first inertia sensor is mounted in, within or on an electronic air processing unit which at least incorporates an air dryer and a multi-circuit protection valve.

3. The electric system of claim 1, wherein a first inertia sensor is mounted in, within or on a foot brake module which incorporates at least one pneumatic channel with a foot brake control valve that generates a pneumatic control signal depending upon the actuation of a foot brake actuation member, and an electric channel with at least one electric position or angle sensor that measures the actuation position or the actuation angle of the foot brake actuation member for generating an electric control signal.

4. The electric system of claim 1, wherein a first inertia sensor is mounted in, within or on the service brake pressure control module which controls the service brake pressure for at least one pneumatic service brake actuator within a control loop.

5. The electric system of claim 1, wherein a first inertia sensor is mounted in, within or on a trailer control module which controls the service brake pressure for a trailer within a control loop.

6. The electric system of claim 1, wherein the at least one control module in, on or within which is mounted the one of the at least one first inertia sensor is configured to be in communication contact with the electronic braking system central control unit EBS ECU.

7. The electric system of claim 1, wherein a first inertia sensor is mounted in, within or on a parking brake valve, a parking brake module and/or a parking brake relay valve.

8. The electric system of claim 1, wherein a first inertia sensor is mounted in, within or on a steering gear module.

9. The electric system of claim 1, wherein a second inertia sensor is located externally to the at least one control module, and wherein a first power supply is configured to power the at least one first inertia sensor and a second power supply is configured to power the second inertia sensor.

10. The electric system of claim 9, wherein the second inertia sensor is mounted in, within or on the electronic braking system central control unit EBS ECU.

11. The electric system of claim 1, at least one of the at least one first inertia sensor and the second inertia sensor include a rotational sensor with any axis and/or a translational sensor or a linear sensor with any axis.

12. A vehicle, comprising:
an electric system of the vehicle, which includes an electronically controlled brake system EBS, including:
a steering angle sensor unit to measure a steering angle of a steering wheel;
at least one control module;
at least one first inertia sensor; and
an electronic braking system central control unit (EBS ECU) of the electronically controlled brake system (EBS);
wherein the at least one control module is external to the steering angle sensor unit,
wherein the at least one control module is external to the electronic braking system central control unit (EBS ECU),
wherein at least one of the at least one control module has mounted in it, within it or on it one of the at least one first inertia sensor,
wherein the electric system provides sensor information to provide dynamic control for an automated driving situation of the vehicle,
wherein the at least one control module includes an electronic air processing unit coupled to a foot brake module,
wherein the electronic air processing unit is coupled to service brake pressure control modules, each of which is coupled to the foot brake module,
wherein the service brake pressure control modules are coupled electrically or electronically with the EBS ECU, wherein inertia information with respect to a center of gravity of the vehicle is used by the EBS ECU to improve a functionality of EBS including dynamic stability control of the vehicle,
wherein the at least one control module has one common housing for its elements or components or has a plurality of housings directly attached to each other, in which the elements or the components are distributed among the plurality of the housings, wherein the at least one first inertia sensor is mounted within or directly on the one housing or within or directly on one housing of the plurality of housings attached to each other of the at least one control module,
wherein by locating the at least one inertia sensors in or on control modules of the electric system, the inertia information provided is captured accurately with respect to a functionality of the control module in or on which the at least one inertia sensor is located, so as to improve dynamic control of the vehicle, and
wherein the electronic air processing unit includes at least an air dryer and a multi-circuit protection valve, and wherein the electronic air processing unit forms a part of the electronically controlled brake system EBS as it provides the EBS with dried and purified process air.

13. The vehicle of claim 12, wherein the vehicle includes a tractor vehicle adapted for towing a trailer.

14. The vehicle of claim 13, wherein the electronic air processing unit, the foot brake module, a trailer control module, a parking brake valve, a parking brake module and/or parking brake relay valve, a service brake pressure control module, a steering gear module, the steering angle sensor unit and the EBS ECU are mounted on the tractor vehicle.

15. The vehicle of claim 12, wherein a steering gear module is connected electronically with the EBS ECU, so that information provided by the first inertia sensor within the steering gear module, which provides inertia information with respect to a chassis of the vehicle, is used by the EBS ECU to improve functionality of the EBS.

16. The vehicle of claim 15, wherein the inertia sensor unit is read in by the EBS ECU for stability control functions.

17. The electric system of claim 1, wherein a steering gear module is connected electronically with the EBS ECU, so that information provided by the first inertia sensor within the steering gear module, which provides inertia information with respect to a chassis of the vehicle, is used by the EBS ECU to improve functionality of the EBS.

18. The electric system of claim 17, wherein the inertia sensor unit is read in by the EBS ECU for stability control functions.

19. An electric system of a vehicle, which includes an electronically controlled brake system EBS, comprising:
- a steering angle sensor unit that measures the steering angle of a steering wheel;
- at least one control module;
- at least one first inertia sensor; and
- an electronic braking system central control unit EBS ECU of the electronically controlled brake system EBS;
- wherein, the at least one control module is external to the steering angle sensor unit,
- wherein, the at least one control module is external to the electronic braking system central control unit EBS ECU,
- wherein at least one of the at least one control module has mounted in, within or on it one of the at least one first inertia sensor, and in that the at least one control module in, on or within which is mounted the one of the at least one first inertia sensor is configured to be in communication contact with the electronic braking system central control unit EBS ECU,
- wherein the electric system provides sensor information to provide dynamic control for an automated driving situation of the vehicle,
- wherein the at least one control module includes an electronic air processing unit coupled to a foot brake module,
- wherein the electronic air processing unit is coupled to service brake pressure control modules, each of which is coupled to the foot brake module,
- wherein the service brake pressure control modules are coupled electrically or electronically with the EBS ECU, wherein inertia information with respect to a center of gravity of the vehicle is used by the EBS ECU to improve a functionality of EBS including dynamic stability control of the vehicle,
- wherein the at least one control module has one common housing for its elements or components or has a plurality of housings directly attached to each other, in which the elements or the components are distributed among the plurality of the housings, wherein the at least one first inertia sensor is mounted within or directly on the one housing or within or directly on one housing of the plurality of housings attached to each other of the at least one control module,
- wherein by locating the at least one inertia sensors in or on control modules of the electric system, the inertia information provided is captured accurately with respect to a functionality of the control module in or on which the at least one inertia sensor is located, so as to improve dynamic control of the vehicle, and
- wherein the electronic air processing unit includes at least an air dryer and a multi-circuit protection valve, and wherein the electronic air processing unit forms a part of the electronically controlled brake system EBS as it provides the EBS with dried and purified process air.

20. The electric system of claim 19, wherein a first inertia sensor is mounted in, within or on a service brake pressure control module, which controls the service brake pressure for at least one pneumatic service brake actuator within a control loop.

21. The electric system of claim 19, wherein any or all of the at least one first inertia sensor and a second inertia sensor are one of: (i) rotational sensors with any axis; or (ii) translational or linear sensors with any axis.

22. A vehicle, comprising:
- an electric system, wherein the vehicle includes an electronically controlled brake system EBS, the electric system including:
  - a steering angle sensor unit that measures the steering angle of a steering wheel;
  - at least one control module;
  - at least one first inertia sensor; and
  - an electronic braking system central control unit EBS ECU of the electronically controlled brake system EBS;
  - wherein, the at least one control module is external to the steering angle sensor unit,
  - wherein, the at least one control module is external to the electronic braking system central control unit EBS ECU,
  - wherein at least one of the at least one control module has mounted in, within or on it one of the at least one first inertia sensor, and in that the at least one control module in, on or within which is mounted the one of the at least one first inertia sensor is configured to be in communication contact with the electronic braking system central control unit EBS ECU,
  - wherein the electric system provides sensor information to provide dynamic control for an automated driving situation of the vehicle,
  - wherein the at least one control module includes an electronic air processing unit coupled to a foot brake module,
  - wherein the electronic air processing unit is coupled to service brake pressure control modules, each of which is coupled to the foot brake module,
  - wherein the service brake pressure control modules are coupled electrically or electronically with the EBS ECU, wherein inertia information with respect to a center of gravity of the vehicle is used by the EBS ECU to improve a functionality of EBS including dynamic stability control of the vehicle,
  - wherein the at least one control module has one common housing for its elements or components or has a plurality of housings directly attached to each other, in which the elements or the components are distributed among the plurality of the housings, wherein the at least one first inertia sensor is mounted within or directly on the one housing or within or directly on one housing of the plurality of housings attached to each other of the at least one control module,
  - wherein by locating the at least one inertia sensors in or on control modules of the electric system, the inertia information provided is captured accurately with respect to a functionality of the control module in or on which the at least one inertia sensor is located, so as to improve dynamic control of the vehicle, and
  - wherein the electronic air processing unit includes at least an air dryer and a multi-circuit protection valve, and wherein the electronic air processing unit forms a part of the electronically controlled brake system EBS as it provides the EBS with dried and purified process air.

23. The vehicle of claim 22, wherein the vehicle is a tractor vehicle adapted for towing a trailer.

24. The vehicle of claim 23, wherein the electronic air processing unit, the foot brake module, the trailer control module, the service brake pressure control module, the steering angle sensor unit and the electronic braking system central control unit EBS ECU are mounted on the tractor vehicle.

* * * * *